United States Patent
Boesen

(10) Patent No.: US 11,799,852 B2
(45) Date of Patent: Oct. 24, 2023

(54) WIRELESS DONGLE FOR COMMUNICATIONS WITH WIRELESS EARPIECES

(71) Applicant: BRAGI GmbH, Munich (DE)

(72) Inventor: Peter Vincent Boesen, Munich (DE)

(73) Assignee: BRAGI GMBH, Munich (DE)

( * ) Notice: Subject to any disclaimer, the term of this patent is extended or adjusted under 35 U.S.C. 154(b) by 171 days.

(21) Appl. No.: 15/471,913

(22) Filed: Mar. 28, 2017

(65) Prior Publication Data

US 2017/0289145 A1 Oct. 5, 2017

Related U.S. Application Data

(60) Provisional application No. 62/314,696, filed on Mar. 29, 2016.

(51) Int. Cl.
| | |
|---|---|
| H04L 29/00 | (2006.01) |
| H04L 9/40 | (2022.01) |
| G10L 17/22 | (2013.01) |
| H04R 1/10 | (2006.01) |
| G10L 17/00 | (2013.01) |
| H04W 12/065 | (2021.01) |

(Continued)

(52) U.S. Cl.
CPC .......... *H04L 63/0861* (2013.01); *G10L 17/00* (2013.01); *G10L 17/22* (2013.01); *H04R 1/1016* (2013.01); *H04R 1/1041* (2013.01); *H04W 12/065* (2021.01); *H04W 12/068* (2021.01); *H04R 2420/07* (2013.01); *H04W 84/18* (2013.01)

(58) Field of Classification Search
CPC .... H04L 63/0861; G10L 17/005; G10L 17/22
USPC ............................................................ 726/4
See application file for complete search history.

(56) References Cited

U.S. PATENT DOCUMENTS

| | | | |
|---|---|---|---|
| 3,934,100 | A | 1/1976 | Harada |
| 4,150,262 | A | 4/1979 | Ono |

(Continued)

FOREIGN PATENT DOCUMENTS

| | | |
|---|---|---|
| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Jeffrey C Pwu
*Assistant Examiner* — Michael D Anderson
(74) *Attorney, Agent, or Firm* — Goodhue, Coleman & Owens, P.C.

(57) ABSTRACT

A wireless earpiece system, method, and one or more wireless earpieces for communications between one or more wireless earpieces and a wireless dongle. The one or more wireless earpieces are associated with the wireless dongle. Biometric readings of a user are performed using the wireless earpieces. Content is communicated between the one or more wireless earpieces and the wireless dongle in response to determining the user is authorized to communicate with the wireless dongle based on the biometric readings. The wireless dongle is physically connected to a report of a system.

11 Claims, 5 Drawing Sheets

(51) Int. Cl.
*H04W 12/06* (2021.01)
*H04W 84/18* (2009.01)

(56) References Cited

U.S. PATENT DOCUMENTS

| | | | |
|---|---|---|---|
| 4,334,315 A | 6/1982 | Ono et al. | |
| 4,375,016 A | 2/1983 | Harada | |
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,230,029 B1 | 5/2001 | Yegiazaryan et al. | |
| 6,275,789 B1 | 8/2001 | Moser et al. | |
| 6,339,754 B1 | 1/2002 | Flanagan et al. | |
| 6,408,081 B1 | 6/2002 | Boesen | |
| 6,424,820 B1 | 7/2002 | Burdick et al. | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,558,529 B2 * | 7/2009 | Seshadri | H04M 1/6033 455/41.2 |
| 7,825,626 B2 | 11/2010 | Kozisek | |
| 7,979,035 B2 | 7/2011 | Griffin et al. | |
| 7,983,628 B2 | 7/2011 | Boesen | |
| 8,095,188 B2 | 1/2012 | Shi | |
| 8,140,357 B1 | 3/2012 | Boesen | |
| 8,300,864 B2 | 10/2012 | Müllenborn et al. | |
| 8,436,780 B2 | 5/2013 | Schantz et al. | |
| 8,630,633 B1 * | 1/2014 | Tedesco | G16H 40/63 455/418 |
| 8,719,877 B2 | 5/2014 | VonDoenhoff et al. | |
| 8,891,800 B1 | 11/2014 | Shaffer | |
| 8,994,498 B2 | 3/2015 | Agrafioti et al. | |
| 9,013,145 B2 | 4/2015 | Castillo et al. | |
| 9,037,125 B1 | 5/2015 | Kadous | |
| 9,081,944 B2 | 7/2015 | Camacho et al. | |
| 9,510,159 B1 | 11/2016 | Cuddihy et al. | |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0002705 A1 | 1/2003 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0017842 A1 | 1/2005 | Dematteo | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2006/0166715 A1 | 7/2006 | Engelen et al. | |
| 2006/0258412 A1 | 11/2006 | Liu | |
| 2008/0090622 A1 | 4/2008 | Kim et al. | |
| 2008/0146890 A1 | 6/2008 | LeBoeuf et al. | |
| 2008/0254780 A1 | 10/2008 | Kuhl et al. | |
| 2009/0017881 A1 | 1/2009 | Madrigal | |
| 2009/0073070 A1 | 3/2009 | Rofougaran | |
| 2009/0296968 A1 | 12/2009 | Wu et al. | |
| 2010/0020983 A1 * | 1/2010 | Waites | H04R 5/04 381/79 |
| 2010/0033313 A1 | 2/2010 | Keady et al. | |
| 2010/0203831 A1 | 8/2010 | Muth | |
| 2010/0320961 A1 | 12/2010 | Castillo et al. | |
| 2011/0169654 A1 * | 7/2011 | Ketari | G08B 13/1427 340/687 |
| 2011/0286615 A1 | 11/2011 | Olodort et al. | |
| 2012/0003937 A1 * | 1/2012 | Zhong | H04M 1/6066 455/41.3 |
| 2014/0122116 A1 | 5/2014 | Smythe | |
| 2014/0163771 A1 | 6/2014 | Demeniuk | |
| 2014/0185828 A1 | 7/2014 | Helbling | |
| 2014/0222462 A1 | 8/2014 | Shakil et al. | |
| 2014/0270227 A1 | 9/2014 | Swanson | |
| 2014/0270271 A1 | 9/2014 | Dehe et al. | |
| 2015/0028996 A1 | 1/2015 | Agrafioti et al. | |
| 2015/0148989 A1 | 5/2015 | Cooper et al. | |
| 2015/0181326 A1 * | 6/2015 | Prest | A61B 5/01 381/380 |
| 2015/0245127 A1 | 8/2015 | Shaffer | |
| 2016/0033280 A1 | 2/2016 | Moore et al. | |

(56) References Cited

U.S. PATENT DOCUMENTS

| | | | |
|---|---|---|---|
| 2016/0073189 A1 | 3/2016 | Lindén et al. | |
| 2017/0078780 A1* | 3/2017 | Qian | H04R 1/105 |

FOREIGN PATENT DOCUMENTS

| | | | | |
|---|---|---|---|---|
| CN | 104837094 A | 8/2015 | | |
| EP | 1017252 A2 | 7/2000 | | |
| EP | 2903186 A1 | 8/2015 | | |
| GB | 2074817 | 4/1981 | | |
| GB | 2508226 A | 5/2014 | | |
| JP | 06292195 | 10/1998 | | |
| WO | 2008103925 A1 | 8/2008 | | |
| WO | 2007034371 A3 | 11/2008 | | |
| WO | 2011001433 A2 | 1/2011 | | |
| WO | 2012071127 A1 | 5/2012 | | |
| WO | 2013134956 A1 | 9/2013 | | |
| WO | 2014043179 A2 | 3/2014 | | |
| WO | 2015061633 A2 | 4/2015 | | |
| WO | 2015110577 A1 | 7/2015 | | |
| WO | 2015110587 A1 | 7/2015 | | |
| WO | WO-2015199879 A1 * | 12/2015 | | H04L 63/0861 |
| WO | 2016032990 A1 | 3/2016 | | |

OTHER PUBLICATIONS

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

Nigel Whitfield: "Fake tape detectors, 'from the stands' footie and UGH? Internet of Things in my set-top box"; http://www.theregister.co.uk/2014/09/24/ibc_round_up_object_audio_dina_iot/ (Sep. 24, 2014).

Staab, Wayne J., et al., "A One-Size Disposable Hearing Aid is Introduced", The Hearing Journal 53(4):36-41) Apr. 2000.

Announcing the $3,333,333 Stretch Goal (Feb. 24, 2014) pp. 1-14.

Ben Coxworth: "Graphene-based ink could enable low-cost, foldable electronics", "Journal of Physical Chemistry Letters", Northwestern University, (May 22, 2013), pp. 1-7.

Bragi is on Facebook (2014), pp. 1-51.

Bragi Update—Arrival of Prototype Chassis Parts—More People—Awesomeness (May 13, 2014), pp. 1-8.

Bragi Update—Chinese New Year, Design Verification, Charging Case, More People, Timeline(Mar. 6, 2015), pp. 1-18.

Bragi Update—First Sleeves From Prototype Tool—Software Development Kit (Jun. 5, 2014), pp. 1-8.

Bragi Update—Let's Get Ready to Rumble, A Lot to be Done Over Christmas (Dec. 22, 2014), pp. 1-18.

Bragi Update—Memories From April—Update on Progress (Sep. 16, 2014), pp. 1-15.

Bragi Update—Memories from May—Update on Progress—Sweet (Oct. 13, 2014), pp. 1-16.

Bragi Update—Memories From one Month Before Kickstarter—Update on Progress (Jul. 10, 2014), pp. 1-17.

Bragi Update—Memories From The First Month of Kickstarter—Update on Progress (Aug. 1, 2014), pp. 1-16.

Bragi Update—Memories From the Second Month of Kickstarter—Update on Progress (Aug. 22, 2014), pp. 1-15.

Bragi Update—New People @Bragi—Prototypes (Jun. 26, 2014), pp. 1-9.

Bragi Update—Office Tour, Tour to China, Tour to CES (Dec. 11, 2014), pp. 1-14.

Bragi Update—Status on Wireless, Bits and Pieces, Testing—Oh Yeah, Timeline(Apr. 24, 2015), pp. 1-18.

Bragi Update—The App Preview, The Charger, The SDK, Bragi Funding and Chinese New Year (Feb. 11, 2015), pp. 1-19.

Bragi Update—What we did Over Christmas, Las Vegas & CES (Jan. 19, 2014), pp. 1-21.

Bragi Update—Years of Development, Moments of Utter Joy and Finishing What we Started(Jun. 5, 2015), pp. 1-21.

Bragi Update—Alpha 5 and Back to China, Backer Day, On Track(May 16, 2015), pp. 1-15.

Bragi Update—Beta2 Production and Factory Line(Aug. 20, 2015), pp. 1-16.

Bragi Update—Certifications, Production, Ramping Up (Nov. 13, 2015), pp. 1-15.

Bragi Update—Developer Units Shipping and Status(Oct. 5, 2015), pp. 1-20.

Bragi Update—Developer Units Started Shipping and Status (Oct. 19, 2015), pp. 1-20.

Bragi Update—Developer Units, Investment, Story and Status(Nov. 2, 2015), pp. 1-14.

Bragi Update—Getting Close(Aug. 6, 2015), pp. 1-20.

Bragi Update—On Track, Design Verification, How it Works and What's Next(Jul. 15, 2015), pp. 1-17.

Bragi Update—On Track, On Track and Gems Overview (Jun. 24, 2015), pp. 1-19.

Bragi Update—Status on Wireless, Supply, Timeline and Open House@Bragi(Apr. 1, 2015), pp. 1-17.

Bragi Update—Unpacking Video, Reviews on Audio Perform and Boy are we Getting Close(Sep. 10, 2015), pp. 1-15.

Healthcare Risk Management Review, "Nuance updates computer-assisted physician documentation solution" (Oct. 20, 2016), pp. 1-2.

Hoyt et al., "Lessons Learned from Implementation of Voice Recognition for Documentation in the Military Electronic Health Record System", The American Health Information Management Association (2017), pp. 1-8.

Hyundai Motor America, "Hyundai Motor Company Introduces a Health + Mobility Concept for Wellness in Mobility", Fountain Valley, California (2017), pp. 1-3.

Last Push Before the Kickstarter Campaign Ends on Monday 4pm CET (Mar. 28, 2014), pp. 1-7.

Stretchgoal—It's Your Dash (Feb. 14, 2014), pp. 1-14.

Stretchgoal—The Carrying Case for the Dash (Feb. 12, 2014), pp. 1-9.

Stretchgoal—Windows Phone Support (Feb. 17, 2014), pp. 1-17.

The Dash + The Charging Case & The Bragi News (Feb. 21, 2014), pp. 1-12.

The Dash—A Word From our Software, Mechanical and Acoustics Team + An Update (Mar. 11, 2014), pp. 1-7.

Update From Bragi—$3,000,000—Yipee (Mar. 22, 2014), pp. 1-11.

* cited by examiner

WIRELESS DONGLE FOR COMMUNICATIONS WITH WIRELESS EARPIECES

PRIORITY STATEMENT

This application claims priority to U.S. Provisional Patent Application 62/314,696, filed on Mar. 29, 2016, and entitled Wireless Dongle for Communications with Wireless Earpieces, hereby incorporated by reference in its entirety.

BACKGROUND

I. Field of the Disclosure

The illustrative embodiments relate to wireless earpieces. More specifically, but not exclusively, the illustrative embodiments relate to communications between one or more wireless earpieces and a wireless dongle.

II. Description of the Art

The growth of wireless devices including wearable wireless devices is increasing exponentially. This growth is fostered by the decreasing size of transceivers, chips, and other components as well as enhanced computing and communications standards and protocols. At the same time, bridging technology gaps between developing technologies and legacy systems continues to be a challenge. For example, updating vehicles, such as planes, cars, and education equipment may be difficult because of the long life expectancy of these devices and how quickly the integrated systems, equipment, and components become outdated. As a result, the integration and utilization of new technologies may be difficult.

SUMMARY OF THE DISCLOSURE

One embodiment provides a wireless earpiece system, method, and one or more wireless earpieces for communications between one or mare wireless earpieces and a wireless dongle. The one or more wireless earpieces are associated with the wireless dongle. Biometric readings of a user are performed using the wireless earpieces. Content is communicated between the one or more wireless earpieces and the wireless dongle response to determining the user is authorized to communicate with the wireless dongle based on the biometric readings. The wireless dongle is physically connected to a report of a system. Another embodiment provides a wireless earpiece including a processor and a memory storing a set of instructions. The set of instructions are executed to perform the method described.

Another embodiment provides a wireless earpiece. The wireless earpiece includes a frame for fitting in an ear of a user. The wireless earpiece further includes a logic engine controlling functionality of the wireless earpiece. The wireless earpiece further includes a number of sensors that perform biometric readings of the user and receive user inputs. The logic engine associates the one or more wireless earpieces with the wireless dongle, and communicates content between the one or more wireless earpieces and the wireless dongle in response to determining the determining the user is authorized to communicate with the wireless dongle based on the biometric readings, wherein the wireless dongle is physically connected to a port of a system.

Another embodiment provides a wireless earpiece system. The wireless earpiece system may include one or more wireless earpieces including sensors for performing biometric readings of the user, logic for operating the one or more wireless earpieces, and a transceiver for wireless communications. The wireless earpiece system may also include a wireless dongle connected to a port of a legacy system by an interface. The wireless dongle is configured to wirelessly communicate with the one or more wireless earpieces through a second transceiver.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
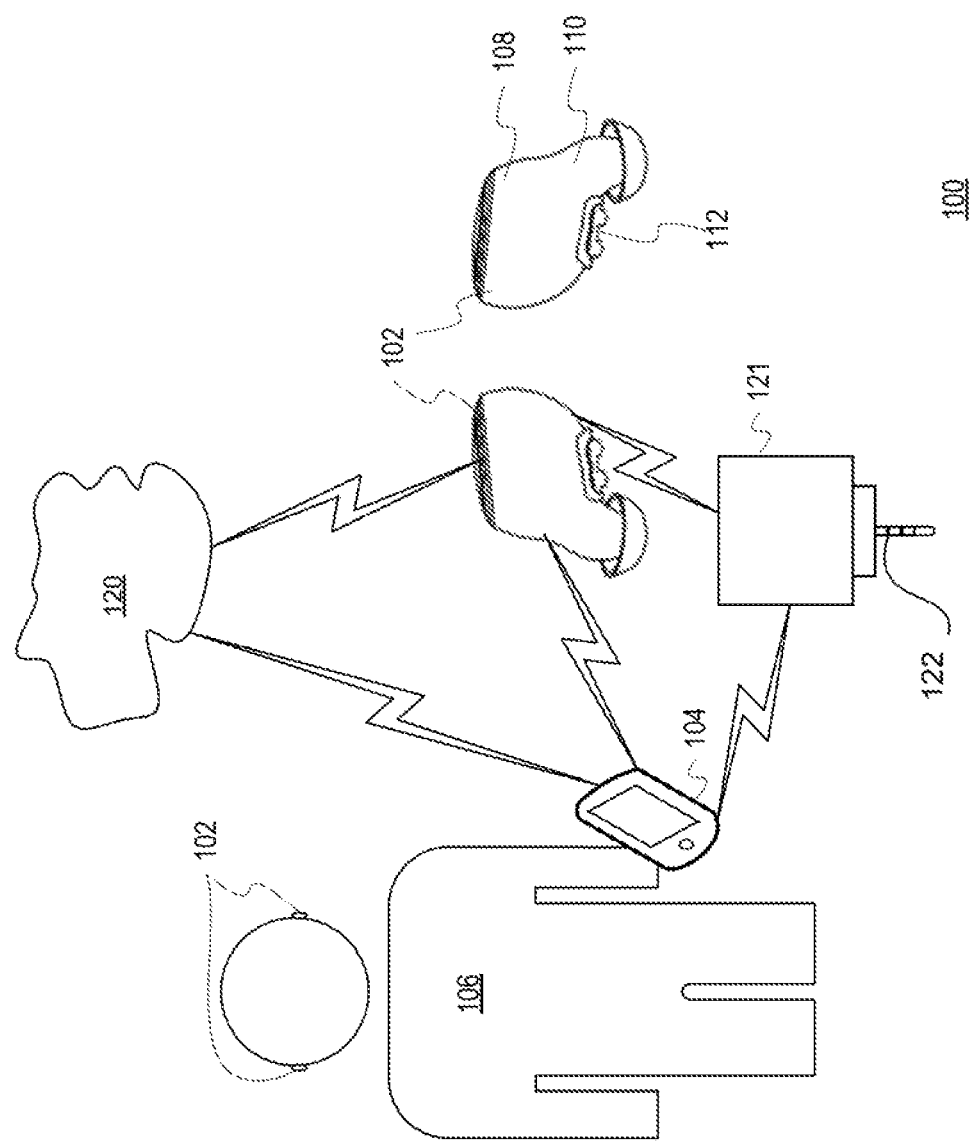
FIG. 1 is a pictorial representation of a communications environment in accordance with an illustrative embodiment.

The illustrative embodiments provide a system, method, and wireless earpieces for communications between one or more wireless earpieces and a wireless dongle. The wireless earpieces are worn in the ears of the user. The wireless earpieces may communicate data, audio, biometrics, or other information to any number of systems, equipment, or devices that the wireless dongle is connected to or in communication with. The wireless donate is a small hardware interface that communicates with the wireless earpieces to perform any number of added functions, features or so forth. The wireless earpieces are configured to communicate wirelessly with the wireless dongle. Any number of communications standards, protocols, or signals may be utilized between the wireless earpieces and the wireless dongle. For example, a Bluetooth, near-field magnetic induction (NFMI), Wi-Fi, cellular, or other radio frequency signals may be utilized between the wireless earpieces and the wireless dongle.

The wireless earpieces are configured to fit at least partially into an external auditory canal of the user. The ear canal is a rich space for obtaining biometric measurements about the user as well as stabilizing the wireless earpieces as they are worn. The wireless earpieces may be utilized during a number of rigorous physical activities that require stability. The shape and configuration of the wireless earpieces allow the wireless earpieces to be worn for long periods of time while gathering valuable information utilizing the sensors of the wireless earpieces. The wireless earpieces may include sensors for measuring pulse rate, blood oxygenation, microphone, position/orientation, location, temperature, altitude, cadence, calorie expenditure, and so forth.

In one embodiment, the wireless dongle may include an interchangeable interface for connecting to any number of computing, communications, vehicle, entertainment, or other systems, components, equipment, or devices (hereinafter "systems"). For example, the wireless dongle may include any number of data or data interfaces for interfacing with legacy devices, such as a 3.5 mm plug, ¼ inch plug, 2.5 mm plug, XLR, RCA, optical mini-plug, universal serial bus (USB), mini USB, micro USB, Lightning connector, HDMI, DB-type connectors, HD-type connectors, modular connectors (e.g. RJ-11, RJ-45, etc.), fiber connectors, coax connectors, and so forth. The different interchangeable interfaces may be changed to make the wireless earpieces compatible with any number of systems utilizing the wireless dongle. Utilization of the wireless earpieces with the wireless donate may provide a functional bridge between systems that currently require a wired connection in order to facilitate bidirectional communications.

The illustrative embodiments allow the wireless earpieces to be integrated into legacy devices that may benefit from the audio processing, communication, and reception abilities of the wireless earpieces. For example, high fidelity audio may be communicated from the wireless earpieces to one or more voice engines of a legacy system. The wireless earpieces may include any number of air and ear-bone microphones that may enhance spatial segregation and isolation of the voice of the user for enhanced outcomes. As a result, the user of the wireless earpieces may not be required to accept low-quality audio when a powerful NFMI, Bluetooth, Wi-Fi, or cellular connection is available. Similarly, audio or data communications from the legacy system may likewise be formatted, processed, or communicated to the wireless earpieces. The wireless nature of the wireless earpieces provides the user the ability to move freely and perform other tasks without worrying about the communications between the legacy system and the wireless earpieces.

Authorization to perform communications between the wireless earpieces and the wireless dongle may be based on one or more passwords, secure identifiers, biometrics, or other authentication information that may be stored or accessed by the wireless earpieces.

In one embodiment, the wireless earpieces may work in combination with a dynamic or static wireless device, such as a cell phone, smart card, smart wearable (e.g., watch, ring, etc.), radio frequency identification tag, or so forth. The biometric readings of the user may be determined from a pair of wireless earpieces or a single wireless earpiece worn by the user. The description included herein may refer to the wireless earpieces individual or collectively.

The wireless earpieces represent a smart wearable device that may be worn within the ears of the user. As with all personal devices, the wireless earpieces may store valuable personal information including name, address, age, sex, user preferences, user biometrics, user financial information for implementing transactions (e.g., debit/credit card numbers, account numbers, user names, passwords, pins, etc.), location information, and other sensitive personal information. The wireless earpieces and the wireless dongle may include a number of sensors that may be configured to read biometric and environmental information associated with the user and the environment of the user. The wireless earpieces may also receive user input from the user including gestures, voice commands, motions, taps, swipes, or other forms of feedback. The biometric information may include heart rate or pattern, fingerprints, mapping of the user's ear/head, voice analysis, skin conductivity, height determinations, and so forth. The biometric readings or information may also be stored for any number of purposes including health monitoring, identification, tracking, and so forth.

The wireless earpieces may be associated or linked with one or more wireless dongles that may be connected, attached, or integrated with any number of systems. In one embodiment, the wireless dongles may be associated with the wireless earpieces utilizing proximity (e.g., placed close to each other, touched together, rubbed, etc.), physical connections, secure identifiers (e.g., pin number, password, etc.), or so forth.

The status and location of the wireless dongle as well as other relevant information may be indicated utilizing audible indicators (e.g., sounds, spoken commands, text-to-speech (TTS) communications, etc.), tactile feedback, visual commands (e.g., displayed by the wireless earpieces, a connected wireless device, etc.), messages (e.g., text messages, email, in-app communications, etc.), and so forth. For example, the wireless earpieces may indicate that the wireless earpieces are linked with the wireless dongle and communicating. The wireless earpieces may also indicate when the link to the wireless dongle has been severed (e.g., distance, interference, etc).

The illustrative embodiments provide additional security because the use of a screen or display is not required to communicate information or data. For example, the information may be communicated between the wireless dongle and the wireless earpieces for direct consumption by the user providing enhanced privacy. The user may specify that only authorized or otherwise specified users of the wireless earpieces are allowed to communicate with a specified wireless dongle. For example, identifying biometric information and/or user input may be required to identify and authenticate the user.

The illustrative embodiments may allow a user to loan the wireless earpieces to another user without concern for breaching or contamination of their own unique personal biometric data or that of the associated wireless dongles and interconnected devices. In one embodiment, the primary or administrative user may, establish profiles for any number of users that may utilize a single set of wireless earpieces. For example, the primary user may control the user profiles of the secondary users that allows or prevents them from accessing one or more wireless dongles. As a result, any number of users may be able to control and manage access to different data, functions, and so forth available through the wireless earpieces.

The wireless earpieces may include any number of sensor arrays configured to capture information about the user. The large amount of data may be utilized to authenticate the user for any number of requests, such as communicating with the wireless dongle. The wireless earpieces may configure themselves to perform various functions as well as sending commands to any number of proximate devices (whether connected to the wireless dongle or not) to implement actions, commands, requests, or transactions. The wireless earpieces may learn over time in response to selections made utilizing the wireless earpieces or interconnected devices, such as a wireless dongle or a cell phone. The sensors may sense dynamic manifestations including movement patterns, fluidity, hesitations, volume of the voice, amplitude and frequency modulations (e.g, jitter, shimmer rates, etc.) temperature fluctuations, increases or decreases in heart rate, and level of sweat production for comparison utilizing logic of the wireless earpieces to generate one or more actions. Alerts may be played to the user indicating the status of the wireless earpieces and the wireless dongle (e.g., paired, pairing in progress, awaiting user verification, communications in progress, audio being streamed, communications approved, communications rejected, etc.).

FIG. 1 is a pictorial representation of a communication environment 100 in accordance with an illustrative embodiment. The wireless earpieces 102 may be configured to communicate with each other and with one or more wireless devices, such as a wireless device 104 and a wireless dongle 121. The wireless earpieces 102 may be worn by a user 106 and are shown both as worn and separately from their positioning within the ears of the user 106 for purposes of visualization. A block diagram of the wireless earpieces 102 if further shown in FIG. 3 to further illustrate components and operation of the wireless earpieces 102. The wireless earpieces 102 may represent a new type of wearable devices that are worn in the ears of the user referred to as "hearables".

In one embodiment, the wireless earpieces 102 include a frame 108 shaped to fit substantially within the ears of the user 106. The frame 108 is a support structure that at least partially encloses and houses the electronic components of the wireless earpieces 102. The frame 108 may be composed of a single structure or multiple structures that are interconnected. The frame 108 defines an extension 110 configured to fit substantially within the ear of the user 106. The extension 110 may house one or more speakers, ear-bone microphones, or vibration components for interacting with the user. The extension 110 may be removable covered by one or more sleeves. The sleeves may be changed to fit the size and shape of the user's ears. The sleeves may come in various sizes and have extremely tight tolerances to fit the user 106 and one or more other users that may utilize the wireless earpieces 102 during their expected lifecycle. In another embodiment, the sleeves may be custom built to support the interference fit utilized by the wireless earpieces 102 while also being comfortable while worn.

In one embodiment, the frame 108 or the extension 110 (or other portions of the wireless earpieces 102) may include sensors 112 for sensing pulse, blood oxygenation, temperature, voice characteristics, skin conduction, glucose levels, impacts, activity level, position, location, orientation, as well as any number of internal or external user biometrics. A first set of the sensors 112 may represent external sensors that may sense user gestures, contact, motions, fingerprints, and external conditions (e.g., temperature, humidity, pressure, etc.). A number of the sensors 112 may also be internally positioned within the wireless earpieces 102. For example, the sensors 112 may represent metallic contacts, optical interfaces, thermometers, or micro-delivery systems for receiving and delivering information. Small electrical charges may be sensed within the ear of the user 106 as well as passed through the sensors 112 to analyze the biometrics of the user 106 including pulse, skin conductivity, temperature, blood analysis, sweat levels, and so forth. Sensors 112 may also be utilized to provide a small electrical current which may be useful for alerting the user, stimulating blood flow, alleviating nausea, or so forth.

In some applications, temporary adhesives or securing mechanisms (e.g., clamps, straps, lanyards, extenders, chargers, portable battery packs, etc.) may be utilized to ensure that the wireless earpieces 102 remain in the ears of the user 106 even during the most rigorous and physical activities. For example, the wireless earpieces 102 may be utilized during marathons, swimming, team sports, biking, hiking, parachuting, or so forth. The wireless earpieces 102 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions.

The wireless device 104, the wireless dongle, or the wireless earpieces 102 may communicate directly or indirectly with one or more wired or wireless networks, such as a network 120. The wireless earpieces 102 may include logic for dynamically configuring components of the wireless earpieces 102, such as speakers and microphones, to the conditions of the communication environment 100.

The wireless earpieces 102 may determine their position with respect to each other as well as the wireless device 104 and a wireless dongle 121. For example, position information for the wireless earpieces 102, the wireless dongle 121, and the wireless device 104 may determine proximity of the devices in the communication environment 100. The wireless dongle 121 may represent a miniature wireless transceiver for communicating with a connected system. In one embodiment, the wireless dongle 121 may perform processing or formatting of the data before or after sending or receiving data, content, or other information. The wireless dongle 121 may be actively or passively powered utilizing batteries, fuel cells, induction circuits, solar cells, or so forth. The wireless dongle 121 may also be powered by a legacy system through a connector 122. For example, the wireless dongle 121 may be powered by an audio port, data port, or other port/interface of the legacy system, such as a vehicle, computing system, or go to and older wireless device. As a result, the wireless dongle 121 may not require an internal power source, such as a battery.

In one embodiment, the communications and features performed between the wireless earpieces 102 and the wireless dongle 121 may be controlled audibly, tactilely, using gestures, motions or any number of other types of input. Confirmation or alerts regarding the communications, actions, or features performed by the wireless earpieces 102 and the wireless dongle 121 may be communicated to the user using verbal confirmations, sounds, vibrations, or so forth.

In one embodiment, the wireless earpieces 102 and the corresponding sensors 112 (whether internal or external) may be configured to take a number of measurements or log information during normal usage. The sensor measurements may be utilized to extrapolate other measurements, factors, or conditions applicable to the user 106. For example, the sensors 112 may monitor the user's heartbeat or EKG to determine the user's unique pattern or characteristics. The user 106 or another party may configure the wireless earpieces 102 and the wireless dongle 121 directly or through a connected device and application (e.g., mobile app with a graphical user interface) to store or share location or identification information, audio, images, and other data. The wireless dongle 121 may be configured to communicate with any number of preset devices or users. Communications from the wireless dongle 121 may include the status of the wireless dongle 121 as well as the identifying information associated with the wireless dongle 121.

Some examples of standard usage of the wireless earpieces 102 may include detecting and recording a heartbeat, setting a biometric information for identification of a user and locating the wireless dongle 121, setting noise thresholds and the associated speaker volume level or microphone sensitivity, setting a user specified gesture/input for performing an action (e.g., playing music, opening an application, providing an audio indication of biometric feedback, etc.), active participation in a conversation, listening to music, or so forth. As a result, the wireless earpieces 102 may be customized to detect the presence of the wireless dongle 121 as well as store and access information associated with the wireless dongle 121. A combination, sequence, or concurrent receipt of biometrics and user input may be associated with the wireless dongle 121 to ensure secure access to the wireless dongle 121 and interconnected legacy system. Thus, access to various wireless dongle's as well as the associated features, functions, and data may be secured and protected utilizing unique identifiers. Distinct user profiles and access preferences may be utilized to ensure that multiple users may utilize the wireless earpieces 102 with data, functionality, and access for each user and tag being completely secured.

In one embodiment, each of the sensors 112 of the wireless earpieces 102 may perform baseline readings to determine which user is utilizing the wireless earpieces 102 and to adapt to communications environments 100 that may be quiet, slightly noisy, loud, or anything in between. For example, the wireless earpieces 102 may determine which of a number of users associated with the wireless earpieces 102 or a guest is utilizing the wireless earpieces 102 and the applicable communications environment 100 (e.g., the user's home, train station, work out areas, office environment, mechanical shop, sports venue, etc.). In one embodiment, the wireless earpieces 102 may determine wireless dongles, legacy systems, data, functions, and features that may be accessed based on the user, the user's authorization level, location, activity, and so forth. The components of the wireless earpieces 102, such as the speakers and microphones may then be self-adjusted based on the identified user and information associated with the communications environment 100.

The wireless earpieces 102 may include any number of sensors 112 and logic for measuring and determining, user biometrics, such as pulse rate, skin conduction, blood oxygenation, temperature, calories expended, voice and audio output, position, and orientation (e.g., body, head, etc.). The sensors 112 may also determine the user's or tags location, position, velocity, impact levels, and so forth. The sensors 112 may also receive user input and convert the user input into commands or selections made across the personal devices of the personal area network. For example, the user input detected by the wireless earpieces 102 may include voice commands, head motions, finger taps, finger swipes, motions or gestures, or other user inputs sensed by the wireless earpieces 102 and sent as commands to be implemented by the legacy system connected to the wireless dongle 121. The user input may be measured by the wireless earpieces 102 and converted into internal commands (utilized by the wireless earpieces 102 themselves) or external commands that may be sent to one or more external devices, such as the wireless dongle 121, the wireless device 104, a tablet computer, or so forth. For example, the user 106 may create a first specific head motion and first voice command that when detected by the wireless earpieces 102 are utilized to automatically receive audio from the wireless dongle 121, a first gesture and a second voice command may authorize the wireless earpieces 102 to perform bidirectional communication with the wireless dongle 121.

The wireless earpieces may communication with any number of other sensory devices in the communication environment 100 to measure information and data about the wireless dongle 121, the user 106, and the communication environment 100 itself. In one embodiment, the communication environment 100 may represent all or a portion of a personal area network. The wireless earpieces 102 may be utilized to control, communicate, manage, or interact with a number of other wearable devices or electronics, such as smart glasses, helmets, smart glass, watches or wrist bands, other wireless earpieces, chest straps, implants, displays, clothing, or so forth. A personal area network is a network for data transmissions among devices, such as personal computing, communications, camera, vehicles, entertainment, and medical devices. The personal area network may utilize any number of wired, wireless, or hybrid configurations and may be stationary or dynamic. For example, the personal area network including all of the devices of the communications environment 100 may utilize wireless network protocols or standards, such as INSTEON, IrDA, Wireless USB, Bluetooth, NFMI, Z-Wave, ZigBee, Wi-Fi, ANT+ or other applicable magnetic or radio frequency signals. In one embodiment, the personal area network may move with the user 106.

In other embodiments, the communication environment 100 may include any number of devices, components, or so forth that may communicate with each other directly or indirectly through a wireless (or wired) connection, signal, or link, such as that available with the wireless dongle 121. The communication environment 100 may include one or more networks and network components and devices represented by the network 120, such as routers, servers, signal extenders, intelligent network devices, computing devices, or so forth. In one embodiment, the network 120 of the communication environment 100 represents a personal area network as previously disclosed. The network 120 may also represent a number of different network types.

Communications within the communication environment 100 may occur through the network 120 or may occur directly between devices, such as the wireless earpieces 102, the wireless device 104, and the wireless dongle 121, or indirectly through a network, such as a Wi-Fi network. The network 120 may communicate with or include a wireless network, such as a Wi-Fi, cellular (e.g., 3G, 4G, 5G, PCS, GSM, etc.), Bluetooth, or other short range or long range radio frequency network. The network 120 may also include or communicate with any number of hard wired networks, such as local area networks, coaxial networks, fiber-optic networks, network adapters, or so forth. Communications within the communication environment 100 may be operated by one or more users, service providers (e.g., secure, public, private, etc.), or network providers.

The wireless earpieces 102 may play, communicate, or utilize any number of alerts or communications to indicate the status of the wireless earpieces 102 or wireless dongle 121 as well as to provide audible menus, confirmations of commands, execution of applications or features, and so forth. For example, one or more alerts may indicate when the wireless dongle 121 is in direct communication with the wireless earpieces 102. The alerts may also indicate whether the user is authorized to communicate with the wireless dongle 121 based on biometric readings, user input, and so forth (e.g., passwords, identifiers, combinations of passwords, sequential verification, etc.). The alert may also provide feedback for controlling provide feedback for controlling a legacy system connected to the wireless dongle 121. Other information, such as the communications range, the battery status of the wireless dongle 121 and wireless earpieces 102, and various other available information may also be communicated to the user 106.

In other embodiments, the wireless earpieces 102 may also vibrate, flash, play a tone or other sound, or give other indications of the access process status in order to prompt user actions (e.g., giving a sequence of verbal, motion, or audio search instructions, provide additional feedback, etc.) or implement any number of associated steps. The wireless earpieces 102 may also communicate an alert to the wireless device 104 that shows up as a notification, message, or other indicator indicating the necessity for configuration/re-configuration or a changed status of the configuration process, such as an audio alert that "that tag has changed locations."

The wireless earpieces 102, wireless dongle 121, or the wireless device 104 may include logic for automatically implementing authorization and communication links in response to wireless earpiece set-up, start-up, condition changes (e.g., location, activities, etc.), event happenings, user requests or various other conditions and factors of the communication environment 100. For example, the wireless device 104 may communicate instructions received from the wireless earpieces 102 for the user 106 to encrypt or otherwise secure communications between the wireless dongle 121 and the wireless earpieces 102. The wireless device 104 may include an application that displays instructions and information to the user 106 for managing various features, functions, and access to the wireless dongle 121.

In one embodiment, the wireless device 104 may utilize short-range or long-range wireless communications to communicate with the wireless earpieces 102 or wireless dongle 121 through a wireless signal or devices of the communication environment 100. For example, the wireless device 104 may include a Bluetooth and cellular transceiver within the embedded logical components. The wireless dongle 121 shows one example of an interface 122 that may be utilized to connect the wireless dongle 121 to any number of legacy systems. In one embodiment, the wireless dongle 121 may allow for multiple interfaces, such as the interface 122, to be used with the wireless dongle 121. As a result, the wireless dongle 121 may be utilized with any number of legacy systems as further shown in FIG. 2.

As noted, the layout of the internal components of the wireless earpieces 102 and the limited space available for a product of limited size may affect where the sensors 112 and other components may be positioned. The positions of the sensors 112 within each of the wireless earpieces 102 may vary based on the model, version, and iteration of the wireless earpiece design and manufacturing process.

Figure 2:
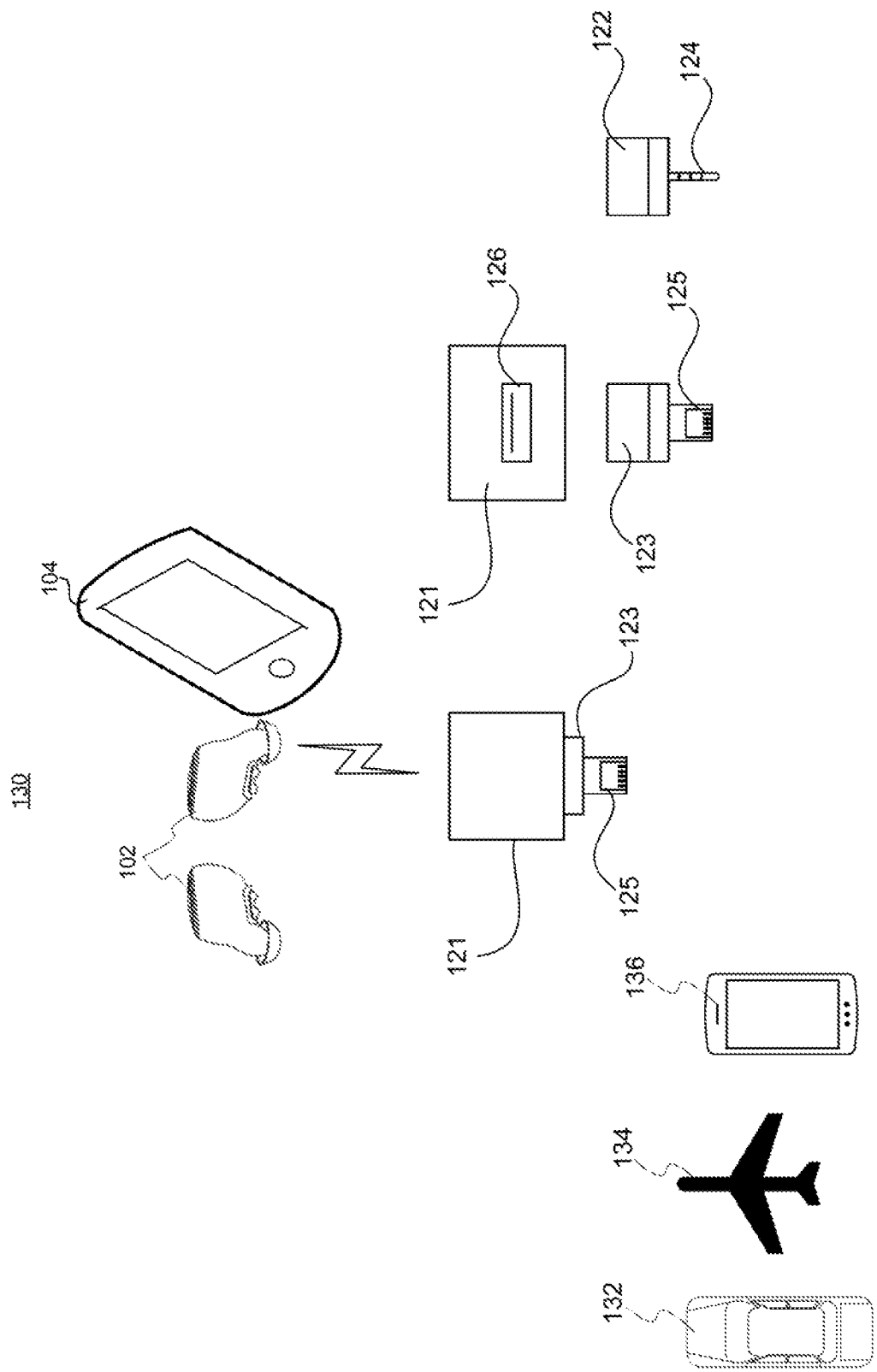
FIG. 2 is a pictorial representation of a communications system in accordance with an illustrative embodiment.

FIG. 2 illustrates a pictorial representation of a communications system 130 in accordance with an illustrative embodiment. The communications system 130 including a number of legacy systems 132, 134, 136 may represent any number of environments, vehicles, devices, locations, structures, or places where a user may utilize the wireless earpieces 102 and the wireless dongle 104. For example, all or portions of the communications system 130 may represent a wireless earpiece system. The legacy systems 132, 134, 136 represent any number of devices, equipment, systems, vehicles, components, or other electronic devices. For example, the legacy system 134 may represent an airliner with ports that are not easily compatible with the wireless earpieces 102. As a result, a user may be able to use the wireless earpieces 102 while aboard the legacy system 134 represented by airplane to enjoy the audio, noise blocking, and communications features of the wireless earpieces 102.

The communications system 130 expands the capacity of the legacy systems 132, 134, 136 by allowing the wireless earpieces 102 and/or wireless device 104 to interact and receive content and communications from the wireless earpieces 102. As a result, the legacy systems 132, 134, 136 may benefit from the advanced audio, microphone, noise blocking, environmental pass-through sounds, sensors, and logic features of the wireless earpieces 102 and the wireless device 104.

As shown the wireless dongle 121 may include the interfaces 122, 123 configured to be connected to one or more of the legacy systems 132, 134, 136 by the connectors 124 and 125. The interfaces 122, 123 of the wireless dongle 121 are interchangeable and the interfaces 122, 123 are only two examples of numerous potential interfaces corresponding to legacy, existing, or developing interfaces. The wireless dongle further includes port 126 configured to receive the interfaces 122, 123. The port 126 may represent any number of connectors that may interface with the wireless dongle 121. For example, the port 126 may represent a USB port, serial port, pin-based ports, or so forth. The logic, signal generators, amplifiers, filters, transceiver, and other components of the wireless dongle may format signals received from the wireless earpieces 102 and/or wireless device 104 for communication through the selected interfaces 122, 123 and connectors 124 and 125 of the wireless dongle 121.

The interfaces 122, 123 include connectors 124, 125. The connectors are examples of any number of audio, data, video, or physical connectors for connecting the wireless dongle 121 to one or more of the legacy systems 132, 134, 136. As previously noted, common connectors may include one or more XLR (e.g., 3 pin, 7 pin, etc.), 2.5 mm, 3.5 mm TRS mini jack, 6.3 TRS audio jack, RCA, ADAT interface (i.e., DB25), DIN, mini-DIN, BNC, AES/EBU, S/PDF, pin connectors, Digital Visual Interface (DVI), D-subminiature, banana connectors, spade connectors, high-definition multimedia interface (HDMI), FireWire, Unified Display Interface (UDI), SCART, i.LINK, DisplayPort, Digital Media, USB (e.g., Type A, Type B, mini-A, mini-B, micro-A, micro-B, 3.1 Std-A, 3.1 Std-B, 3.1, type C, 4.0, 5.0 etc.), FireWire, Ethernet, MIDI, eSATA, Thunderbolt, or any number of open system, or proprietary jacks, connectors, ports, or interfaces both existing and being developed.

In one embodiment, the wireless dongle 121 may store access information for a number of different wireless earpiece sets that may communicate with the wireless dongle 121. For example, different pin numbers, passwords, or secure identifiers may be utilized by each separate set of wireless earpieces. The wireless dongle 121 may also store preference for authentication, communication security, automatic communications and connections, and so forth.

Figure 3:
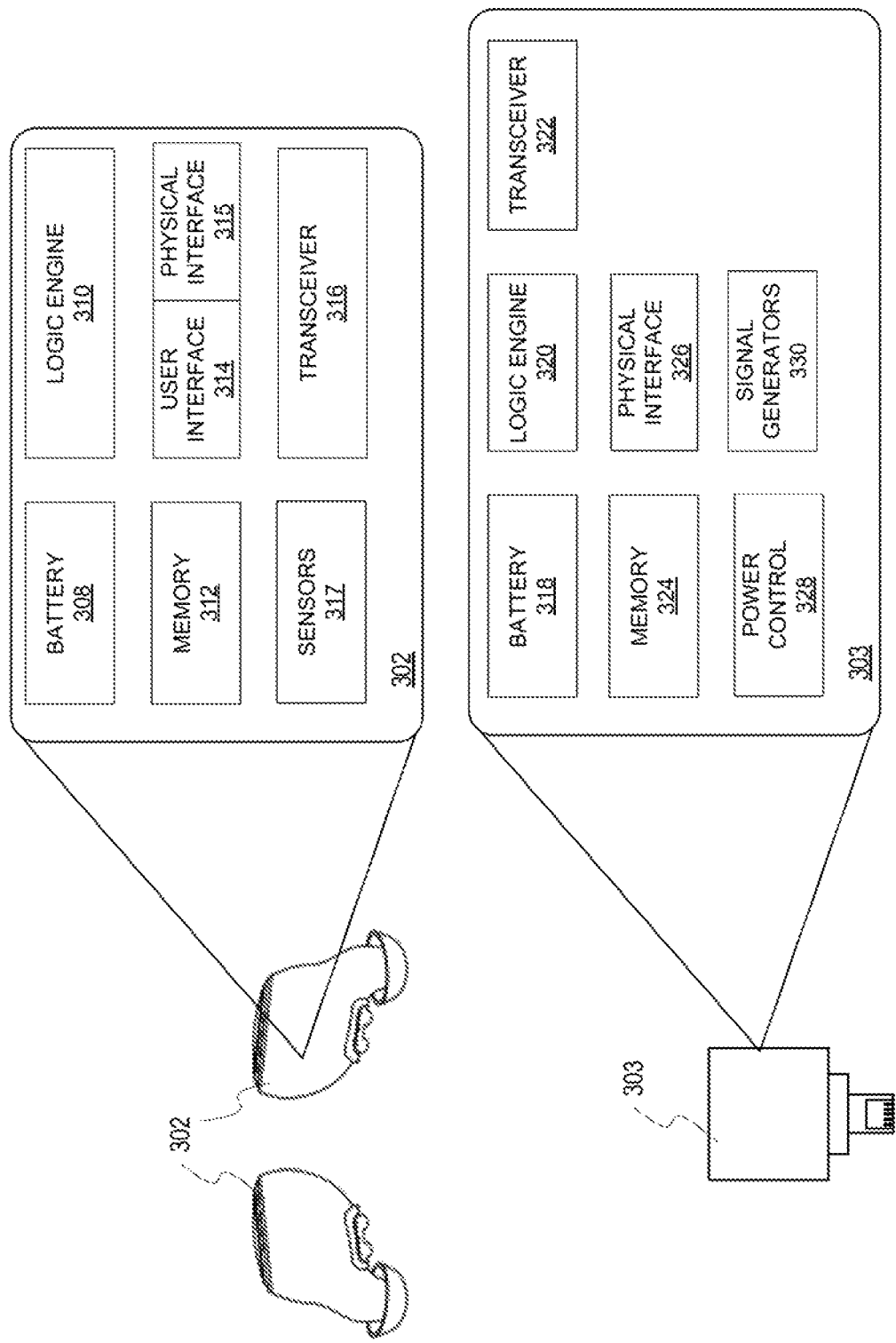
FIG. 3 is a block diagram of wireless earpieces and a wireless dongle in accordance with an illustrative embodiment.

FIG. 3 further illustrates a block diagram of wireless earpieces 302 and a wireless dongle 303 in accordance with an illustrative embodiment. The wireless earpieces 302 may be wirelessly linked to any number of wireless dongles or wireless devices, such as the wireless dongle 303 and/or the wireless device 104 of FIG. 1. Examples of wireless devices include wearable devices, communications devices, computers, entertainment devices, vehicle systems, exercise equipment, or so forth. Sensor measurements, user input, and commands may be received from either the wireless earpieces 302, the wireless dongle 303, or the wireless device (not shown) for processing and implementation on any of the devices (or other externally connected devices). Reference to the wireless earpieces 302 may descriptively or functionally refer to either the pair of wireless earpieces (wireless earpieces) together or individual wireless earpieces (left wireless earpiece and right wireless earpiece) without limitation. Description of components of the wireless earpieces 302 similarly named with regard to the wireless dongle 303 are similarly applicable.

In some embodiments, the wireless dongle 303 may also act as a logging tool for sensor data or measurements made by the wireless earpieces 302. For example, the wireless dongle 303 may receive and share data captured by the wireless earpieces 302 in real-time including biometric or location information, such as authentication biometrics or input, status of the user (e.g., physical, emotional, etc.), last known location of the wireless dongle 303, and so forth. For example, the wireless dongle 303 may communicate the data, information, measurements, or data to a connected legacy system (not shown) or to other wireless devices.

As a result, the wireless dongle 303 may be utilized to store, display, and synchronize sensor data received from the wireless earpieces 302. For example, in one embodiment, the wireless dongle 303 may display user pulse rate, temperature, proximity, location, blood oxygenation, distance, calories burned, and so forth as measured by the wireless earpieces 302. The user or a request may also be authenticated by sending the data to the wireless dongle 303 (as well as an associated legacy system) that may then authenticate the data and authorize communication, a request, function, feature, or so forth. The wireless dongle 303 may be configured to receive and display alerts that indicate conditions to initiate, process, and authenticate a search or locate request have been met. For example, if a request is made, the wireless earpieces 302 may automatically play an alert, message, or in-app communication, such as "please authenticate you have permission to communicate with this wireless dongle and the device it is connected to."

The wireless earpieces 302 and the wireless dongle 303 may have any number of electrical configurations, shapes, and colors and may include various circuitry, connections, and other components utilized to perform the illustrative embodiments. In one embodiment, the wireless earpieces 302 may include a logic engine 310, a memory 312, a user interface 314, a physical interface 315, a transceiver 316, and sensors 317. Similarly, the wireless dongle 303 may have a battery 318, a logic engine 320, a transceiver 322, memory 324, a physical interface 326, a power control 328, and signal generators 330.

The battery 308 is a power storage device configured to power the wireless earpieces 302. In other embodiments, the battery 308 may represent a fuel cell, thermal electric generator, piezo electric charger, solar charger, ultra-capacitor, or other existing or developing power storage technology. The sensors 317 may also be utilized to measure the temperature of the battery 308 and the conditions and status of internal components of the wireless earpieces. The sensors 317 may also be utilized to determine data about internal and external conditions and factors applicable to the user, the user's environment, a communicating wireless device, or so forth. Other conditions and factors sensed by the sensors 317 (e.g., water/humidity, pressure, blood oxygenation, blood content levels, altitude, position, impact, radiation, etc.) may also be determined with the data being processed by the logic engine 310.

The logic engine 310 is the logic that controls the operation and functionality of the wireless earpieces 302. The logic engine 310 may include circuitry, chips, and other digital logic. The logic engine 310 may also include programs, scripts, and instructions that may be implemented to operate the logic engine 310. The logic engine 310 may represent hardware, software, firmware, or any combination thereof. In one embodiment, the logic engine 310 may include one or more processors. The logic engine 310 may also represent an application specific integrated circuit (ASIC) or field programmable gate array (FPGA). The logic engine 310 may utilize sensor measurements, user input, user preferences and settings, conditions, factors, and environmental conditions to control communications between the wireless earpieces 302 and the wireless dongle 303. The logic engine 310 may also work with the sensors 317 and other components of the wireless earpieces 302 to authenticate the user. The wireless earpieces 302 may function separately or together to communicate with the wireless dongle 303. In another example, processing and communications may be divided between the wireless earpieces 302 to increase the speed of processing and to load balance any processes being performed. The wireless earpieces 302 may also be configured to communicate with any number of wireless dongles. Multiple forms of identifying information may be utilized to better secure requests authenticated through the wireless earpieces 302.

In one embodiment, the logic engine 310 may perform the authentication determination based on measurements and data from the sensors 317. The logic engine 310 may also perform any number of mathematical functions (e.g. linear extrapolation, polynomial extrapolation, conic extrapolation, French curve extrapolation, polynomial interpretation) to determine or infer the identity of the user from the sensor measurements as well as determine whether a biometric identifier or password is verifiably received. The logic engine 310 may utilize time and other sensor measurements as causal forces to enhance a mathematical function utilized to perform the determinations, processing, and encryption, decryption, and extrapolation performed by the logic engine 310.

The logic engine 310 may also process user input to determine access commands implemented by the wireless earpieces 302 or received by the wireless earpieces 302 through the transceiver 316. Specific actions may be allowed based on sensor measurements, extrapolated measurements, environmental conditions, proximity thresholds, and so forth. For example, the logic engine 310 may implement an authentication macro allowing the user to automatically send audio and data files to the wireless dongle in response to receiving a heartbeat pattern from the wireless dongle 303 and a voice command from the user. In another embodiment, different types of actions may require different levels or combinations of biometric and user information. For example, low value data, such as music files, may require a single piece of identifying information (e.g., ear mapping) whereas high value data, such as secured communications between the devices may require three pieces of identifying information (e.g., skin conductivity, user specified gesture, user sign on to the wireless earpieces 302).

The logic engine 310 is configured to perform all or a substantial portion of the processing needed for the illustrative embodiments. In one embodiment, the logic engine 310 may associate the wireless dongle 303 with the wireless earpieces 302. For example, the logic engine 310 may associate an identifier (e.g., pin number, password, IMEI, serial number, custom name, etc.) of the wireless earpieces 302 with the wireless dongle 303 storing the identifier in the memory 312. The logic engine 310 may also track and record the initial or last known location of the wireless dongle 303. The wireless dongle 303 may be tracked directly if within range of the wireless earpieces 302 or indirectly (e.g. cellular signals, satellite signals, network signals, other users/mesh network nodes, etc.). The logic engine 310 may also facilitate the user in searching for, locating, and navigating to the wireless dongle 303. In one embodiment, the logic engine 310 may execute a mapping application that facilitates the user in driving, walking, writing, or otherwise navigating to the location of the wireless dongle 303. For example, the logic engine 310 may provide instructions or commands for the user interface 314 including a speaker, vibrator, or other interface components to navigate to the wireless dongle 303. Instructions provided to the user through the speaker of the user interface 314 may be particularly secure because outside parties are not able to easily intercept or listen in to the audio feedback. As a result, the user may be able to track or locate the wireless dongle 303 and the associated legacy device.

In another embodiment, the logic 310 may send a message to the wireless dongle 303 from the transceiver 316 to the transceiver 326 to play a sound, light up, vibrate, or otherwise communicate with the user that may be searching for the wireless dongle 303. The physical interface 326 of the wireless dongle 303 may include a user interface and physical interface components as described with respect to the wireless earpieces 302. As a result, user input or feedback may be received directly by the wireless dongle 303.

In one embodiment, a processor included in the logic engine 310 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 312 is a hardware element, device, or recording media configured to store data or instructions for subsequent retrieval or access at a later time. The memory 312 may represent static or dynamic memory. The memory 312 may include a hard disk, random access memory, cache, removable media drive, mass storage, or configuration suitable as storage for data, instructions, and information. In one embodiment, the memory 312 and the logic engine 310 may be integrated. The memory may use any type of volatile or non-volatile storage techniques and mediums. The memory 312 may store information related to the user, wireless earpieces 302, wireless dongle 303, wireless device, and other peripherals, such as a wireless device, smart glasses, smart watch, smart case for the wireless earpieces 302, wearable device, and so forth. In one embodiment, the memory 312 may store, display, or communicate instructions, programs, drivers, or an operating system for controlling communications with the wireless dongle 303. The memory 312 may also include instructions for controlling the user interface 314 including one or more LEDs or other light emitting components, speakers, tactile generators (e.g., vibrator), and so forth. The memory 312 may also store biometric readings, user input required for specified data, functions, or features, authentication settings and preferences, thresholds, conditions, signal or processing activity, historical information, proximity data, and so forth. The memory 312 may also store instructions, applications, or so forth for tracking and locating the wireless dongle 303, determining the status of the wireless dongle 303, information associated with one or more legacy systems the wireless dongle 303 may be connected to, and so forth.

The transceiver 316 is a component comprising both a transmitter and receiver which may be combined and share common circuitry on a single housing. The transceiver 316 may communicate utilizing NFMI, Bluetooth, Wi-Fi, Zig-Bee, Ant+, near field communications, wireless USB, infrared, mobile body area networks, ultra-wideband communications, cellular (e.g., 3G, 4G, 5G, PCS, GSM, etc.), infrared, or other suitable radio frequency, magnetic, or optical standards, networks, protocols, or communications. For example, the transceiver 316 may coordinate communications and actions between the wireless earpieces 302 utilizing NFMI communications. The transceiver 316 may also be a hybrid transceiver that supports a number of different communications. For example, the transceiver 316 may communicate with the wireless dongle 303, wireless devices, or other systems utilizing wired interfaces (e.g., wires, traces, etc.), NFC, or Bluetooth communications. The transceiver 316 may also detect amplitudes and infer distance between the wireless earpieces 302 and external devices, such as the wireless dongle 303, and associated wireless device, or a smart case of the wireless earpieces 302.

In one embodiment, the transceiver 316 may be configured to determine a location of the wireless dongle 303 utilizing, signal strength, wireless triangulation, or directional feedback. For example, the transceiver 316 may include one or more antennas that facilitate detecting the amplitude, communicated direction of signals received, and so forth. In one embodiment, the wireless earpieces 302 may work as separate receivers to determine a distance, orientation, or location of the wireless dongle 303. For example, when worn, the wireless earpieces 302 may be separated by a known distance associated with the user's head. The distance between the wireless earpieces 302 as well as the time stamp associated with when a signal was received may be utilized to determine a direction and/or location to the wireless dongle 303. Similarly, any number of tables, distances, thresholds, database entries, or historical information may be utilized to determine a distance and direction between the wireless earpieces 302 and the wireless dongle 303 in a particular environment. Directional antennas or communications techniques may be utilized between the wireless earpieces 302 and the wireless dongle 303 to ensure effective communications whenever possible.

The components of the wireless earpieces 302 may be electrically connected utilizing any number of wires, contact points, leads, busses, wireless interfaces, or so forth. In addition, the wireless earpieces 302 may include any number of computing and communications components, devices or elements which may include busses, motherboards, circuits, chips, sensors, ports, interfaces, cards, converters, adapters, connections, transceivers, displays, antennas, and other similar components. The physical interface 315 is hardware interface of the wireless earpieces 302 for connecting and communicating with wireless devices, wireless dongle 303, or other electrical components, devices, or systems.

The physical interface 315 may include any number of pins, arms, or connectors for electrically interfacing with the contacts or other interface components of external devices or other charging or synchronization devices. For example, the physical interface 315 may be a micro USB port that may allow the wireless earpieces 302 to be linked, paired, or otherwise associated with the wireless earpieces 303. In one embodiment, the physical interface 315 is a magnetic interface that automatically couples to contacts or an interface of a wireless device. In another embodiment, the physical interface 315 may include a wireless inductor for charging the wireless earpieces 302 without a physical connection to a charging device.

The user interface 314 is a hardware interface for receiving commands, instructions, or input through the touch (haptics) of the user, voice commands, or predefined motions. For example, the user interface 314 may include a touch screen, one or more cameras or image sensors, microphones, speakers, and so forth. The user interface 314 may be utilized to control the other functions of the wireless earpieces 302. The user interface 314 may include the LED array, one or more touch sensitive buttons or portions, a miniature screen or display, or other input/output components. The user interface 314 may be controlled by the user or based on commands received from the wireless device. For example, the user may turn on, reactivate, implement searches, or provide feedback utilizing the user interface 314.

In one embodiment, the user interface 314 may include a fingerprint scanner that may be utilized to scan a fingerprint (e.g., the index finger) of a user to authenticate a user, a request, functionality, or so forth. The user interface 314 of each of the wireless earpieces 302 may store identifying information for one or more fingers. In one embodiment, the biometric data of the user may be encrypted and stored within a secure portion of the memory 312 to prevent unwanted access or hacking. The wireless earpieces 302 may also store important biometric data, such as medical information (e.g., medical conditions, allergies, longed biometrics, contacts, etc.) that may be shared in response to an emergency.

In one embodiment, the user may provide user feedback for authenticating communications with the wireless dongle 303 by tapping the user interface 314 once, twice, three times, or any number of times (e.g., sequentially or in a timed pattern). Similarly, a swiping motion may be utilized across or in from of the user interface 314 (e.g., the exterior surface of the wireless earpieces 302) to implement a predefined action. Swiping motions in any number of directions or gestures may be associated with specific requests as well as other activities, such as pair with the wireless dongle 303, share exercise data, share a music playlist, enable a dictation feature, open a specified app, share user vitals, play music, pause, fast forward, rewind, activate a digital assistant (e.g., Siri, Cortana, smart assistant, etc.), track a specified user biometric, or so forth without limitation. The swiping motions and gestures may also be utilized to control actions and functionality of wireless dongles, wireless devices, or other external devices (e.g., smart television, camera array, smart watch, etc.) through wireless signals sent by the transceiver 316. The user may also provide user input for authorizing an action or request by moving his head in a particular direction or motion or based on the user's position or location. For example, the user may utilize voice commands, head gestures, or touch commands to change the content displayed by a wireless device as received from the wireless earpieces 302. For example, a user may provide a verbal command to "connect to my car" for the wireless dongle to be activated to connect to a legacy system, such as the user's car. The speaker(s) of the user interface 314 may then provide audible instructions and indicators which may include authentication information, instructions, or so forth. The user interface 314 may also provide a software interface including any number of icons, soft buttons, windows, links, graphical display elements, and so forth for receiving user input.

In one embodiment, the user interface 314 may periodically utilize one or more microphones and speakers of the wireless earpieces to authenticate the user. The microphone of the user interface 314 may measure various voice characteristics including amplitude, shimmer rates (i.e., changes in amplitude over time) frequency/pitch, jitter rates (i.e., changes in frequency data over time), accent, voice speed, inflection, and so forth. Specific words, phrases, or sounds may be associated with actions as stored in the memory 312 and detected by one or more microphones of the user interface 314. The microphones may include external microphones positioned on the outside surface(s) of the wireless earpieces 302 (e.g., air microphones) as well as internal microphones (e.g., bone, ear-bone microphones, etc.). The wireless earpieces 302 may also recognize a pre-defined vocabulary. For example, specific words may be required to authenticate different requests and action types.

The sensors 317 may include inertial sensors, pulse oximeters, accelerometers, gyroscopes, magnetometers, water, moisture, or humidity detectors, impact/force detectors, thermometers, photo detectors, miniature cameras, microphones, and other similar instruments for identifying the user and reading user biometrics as well as location, utilization of the wireless earpieces 302, external temperature, humidity, pressure, orientation, motion, and so forth. The sensors 317 may also be utilized to determine the biometrics (e.g., determined conditions and status), activity, location, and speed measurements of the user. In one embodiment, the sensors 317 may store data that may be shared with other components (e.g., logic engine 310 authenticating a communication request), users, and devices.

The sensors 317 may include photodetectors, ultrasonic mapping devices, or radar that scan the ear of the user when positioned for utilization. The sensors 317 generate a two or three dimensional scan or topography map of the user's ear and surrounding areas when the wireless earpieces 302 are properly positioned. The mapping may include the internal and/or external portions of the user's ear. The topographical image of the user's ear may be utilized as a stand-alone biometric identifier or may be utilized with other biometric identifiers to identify the user. The image may include the external auditory meatus, scapha, fossa triangularis, scaphoid fossa, helix, antihelix, antitragus, lobule, the tragus, and pinna as well as other internal or external portions of the ear and surrounding head structure.

Externally connected wireless devices as well as the wireless dongle 303 may include components similar in structure and functionality to those shown for the wireless earpieces 302. For example, a wireless device or the wireless dongle 303 may include any number of processors, batteries, memories, busses, motherboards, chips, transceivers, peripherals, sensors, displays, cards, ports, adapters, interconnects, sensors, and so forth. In one embodiment, the wireless device may include one or more processors and memories for storing instructions. The instructions may be executed as part of an operating system, application, browser, or so forth to implement the features herein described. For example, the user may set preferences for the wireless earpieces 302 to work individually or jointly to identify user biometrics for comparison against known values to verify the user is authorized to access, communicate, or perform any number of activities or tasks associated with the wireless dongle 303 and the associated legacy system. Likewise, the preferences may manage the actions taken by the wireless earpieces 302 in response to identifying specific users are utilizing the wireless earpieces 302. For example, an authorized user may be able to use the wireless earpieces 302 to communicate with the audio and communications systems of an aircraft wheras other unauthorized users may not have such rights, access, or privileges.

The wireless dongle 303 or a wireless device may also execute an application with settings or conditions for updating, synchronizing, sharing, saving, processing requests and utilizing biometric information. For example, one of the sensors 317 of the wireless earpieces 302 that has failed may be ignored in response to improper or unreliable data being gathered. As a result, the user identification process for performing authorizations may be dynamically performed utilizing any combination of sensor measurements. For example, the number and position of the sensors 317 utilized to perform status determinations for the user may vary based on failures, inaccurate data, or other temporary or permanent issues with hardware and software of the wireless earpieces 302.

In one embodiment, the wireless dongle 303 may include all or a portion of the components shown in FIG. 3 with regard to the wireless earpieces 302. As previously noted, the wireless dongle 303 may be an actively or passively power device. In one embodiment, the wireless dongle 303 includes a battery 318 to communicate with other devices, such as the wireless earpieces 302, utilizing the transceiver 326. In another embodiment, the wireless dongle 303 may be passively powered by a legacy system to which the wireless dongle 303 is connected. For example, the wireless dongle 303 may include a USB connector that enables the wireless dongle 303 to be powered and/or charge an internal battery 318. The battery 318 may be rechargeable or replaceable. Any number of other power sources may be utilized with regard to the wireless dongle 303.

The logic engine 320 may represent a logic chip, processor, or fixed digital logic that enables the wireless dongle 303 to interact with the legacy system it is connected to. The logic engine 320 may process inputs/outputs to and from the wireless dongle 303 to enable effective communication between the legacy system and the wireless earpieces and associated wireless device. For example, the logic engine 320 may represent a chip configured to implement specified processes, sets, and instructions in response to signals from the wireless earpieces 302 or in response to other conditions, settings, or preferences.

The memory 322 may store identification operational, and functional information, data, and software. For example, specified biometric information, user input, or other secure identifiers may be required to be received by the transceiver 326 of the wireless dongle 303 and verified by the logic engine 320 against data, values, or information stored by the memory 322 in order to be associated with other devices, communicate, provide location information, or so forth. The memory 322 may also store applications, instructions, or other information for interfacing with any number of legacy systems. For example, secure software modules may be loaded to the memory 324 for interfacing with critical legacy systems, such as military vehicles, commercial aircraft, security systems, and so forth. In addition to the interchangeable connectors, the adoptable memory and software systems of the wireless dongle 303 may allow the wireless dongle 303 and associated wireless earpieces 302 to be utilized with any number of legacy systems.

The physical interface 324 may allow the wireless dongle 303 to be physically, magnetically, or electrically coupled with any number of other devices, such as legacy systems. The physical connection enabled by the physical interface 324 may allow for communication of data, audio, or other signals as well as powering the wireless dongle 303. The physical interface 324 may also allow the wireless dongle 303 to be connected to the wireless earpieces 302, a smart case of the wireless earpieces 302, a cell phone associated with the wireless earpieces 302, a battery charger, or other electronic devices. The physical interface 324 may include the interchangeable ports and connectors previously described (e.g. see FIG. 2). In another embodiment, the physical interface 324 may also include user interface components similar to those described for the wireless earpieces 302. For example, the physical interface 324 may include one or more touchscreens or touch sensitive components, light emitting diodes, speakers, microphones, or so forth.

The transceiver 322 may be configured to communicate with the wireless earpieces 302 as well as any number of other devices. For example, the transceiver 322 may include multiple transceivers for communicating with the wireless earpieces 302 utilizing a Bluetooth connection and one or more wireless or wired networks. For example, the transceiver 322 may simultaneously communicate with the wireless earpieces 302 as well as a cellular network.

The power control 328 may control operation of the wireless dongle 303 including power provided by a connected legacy system. The power control 328 may configure the wireless dongle 303 based on the type of connectors being utilized. For example, the pins, current, amperage, and circuits of the wireless dongle 303 may vary based on the selected connector. As a result, the power control 328 may reconfigure the wireless dongle 303 to work regardless of the connector (of many potential connectors) physically connected to the wireless dongle 303.

Similarly, the signal generators 330 may format, convert, interpret, encrypt, or decrypt communications of the wireless dongle 303. In one embodiment, the signal generators 330 may include an number of amplifiers, transformers digital-to-analog converters, analog-to-digital converters, signal processors, and other components that may be utilized to perform communications with the wireless earpieces 302 as well as the legacy system.

As noted, the wireless dongle 303 may also include sensors (not shown). The sensors may detect the orientation, environment, internal characteristics, or other conditions and factors that may affect the wireless dongle 303 and associated legacy system as previously described with regard to the sensors 317 of the wireless earpieces 302.

The transceiver 326 may include one or more of a transmitter and/or receiver. In one embodiment, the wireless dongle 303 may include a transmitter only, in another embodiment, the wireless dongle 303 may include a receiver only, or the wireless dongle 303 may include a transceiver as shown in FIG. 3. The transceiver 326 may be configured to communicate directly or indirectly with one or more wireless earpieces 302, wireless devices, other tags, satellite devices, wireless network equipment, systems, or devices. As previously noted, any number of communications standards, protocols, or signals may be utilized.

Figure 4:
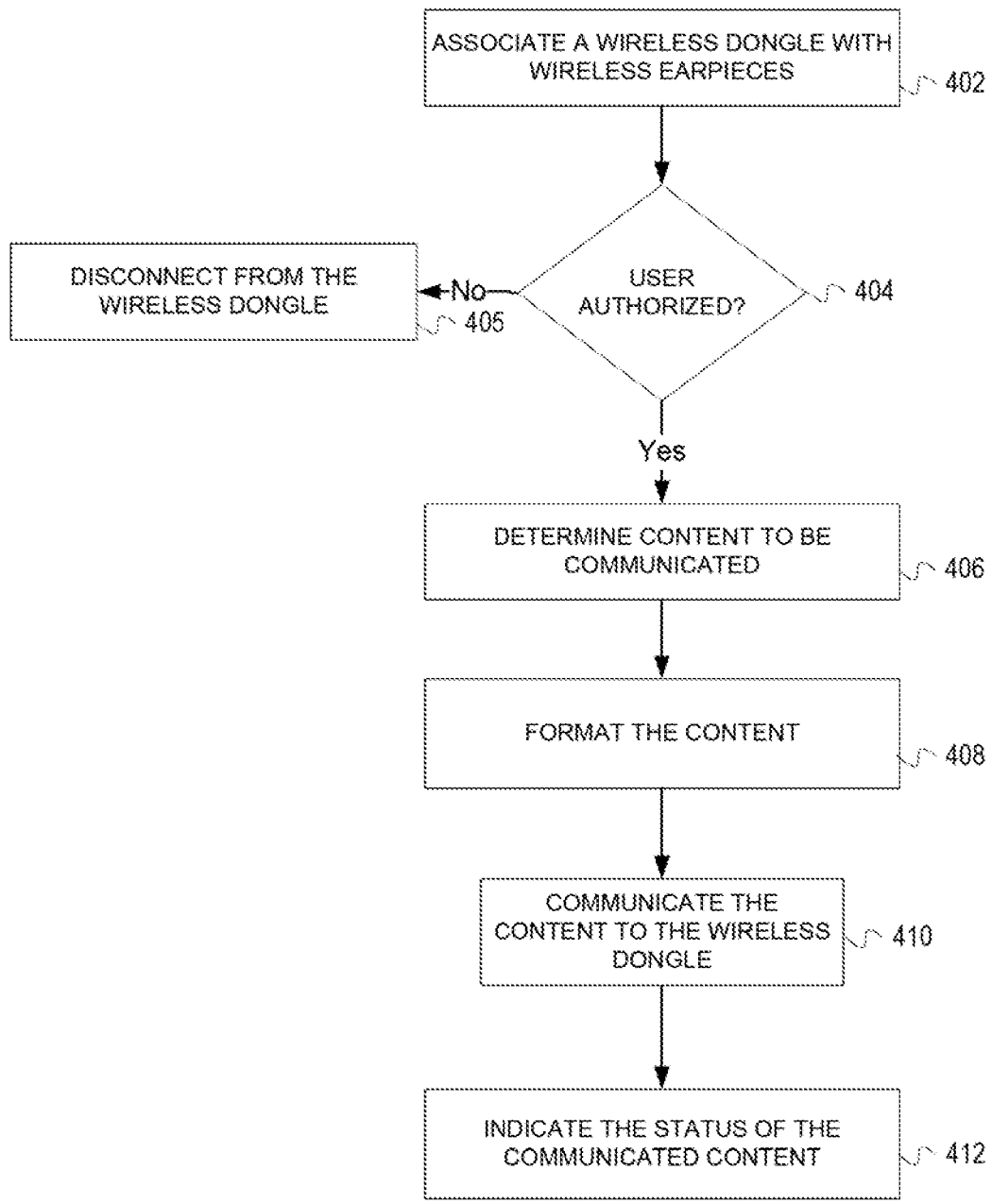
FIG. 4 is a flowchart of a process for communications between wireless earpieces and a wireless dongle in accordance with an illustrative embodiment.

FIG. 4 is a flowchart of a process for communications between wireless earpieces and a wireless dongle accordance with an illustrative embodiment. In one embodiment, the process of FIG. 4 may be implemented by one or more wireless earpieces and a wireless dongle, such as the wireless earpieces 102 and wireless dongle 121 of FIG. 1. For example, the method of FIG. 4 may be performed for both of the wireless earpieces as a pair/set or for each of wireless earpieces individually to communicate with the wireless dongle. The wireless dongle may represent a wireless interface for allowing the wireless earpieces to communicate with legacy systems, devices, equipment, and components. In one embodiment, the wireless earpieces may biometric readings or user input to authenticate or identify the user and that the user is authorized to communicate with the wireless dongle. In one embodiment, the biometric readings and user input may include one or more of pulse, hand gestures, designated motions, voice amplitude, voice frequency, skin conductivity, vocabulary (e.g., spoken password, phrase, recognized speech), blood oxygenation, temperature, heart beat pattern, ear map, calories expended per time period, sweat levels, orientation, position, and so forth.

The method of FIG. 4 may be performed to enable communications between the wireless earpieces and the wireless dongle. In one embodiment, one or more applications, software interfaces, and/or hardware interfaces of the wireless dongle and the wireless earpieces may wirelessly interact to perform the communications of FIG. 4, with only the wireless earpieces referred to for purposes of simplicity.

The process may begin by associating a wireless dongle with wireless earpieces (step 402). The wireless dongle may be associated with the wireless earpieces utilizing any number of processes or steps. For example, the wireless earpieces may be placed in close proximity to the wireless dongle or vice versa to perform a linking or registration process, the wireless earpieces may be physically (e.g. connected via a wire to one or more of the wireless earpieces, a wireless device, a computing system, or a smart case associated with the wireless earpieces, etc.) or wirelessly interfaced with the wireless earpieces (e.g. Bluetooth linking, password or pin verification, etc.). Any number of secure identifiers may be utilized to associate the wireless earpieces with the wireless dongle.

During step 402, various encryption or security protocols may also be established for linking the wireless dongle with the wireless earpieces. For example, any number of secure standards, protocols, encryption methods, or so forth may be established between the devices. Secure communications may be particularly important based on the type and configuration of the legacy system to which the wireless dongle is connected. The wireless earpieces and the wireless dongle may also specify preferences or settings indicating which users are allowed to perform communications or other actions between the one or more wireless earpieces and the wireless dongle. The preferences or settings may also establish the biometric readings of the user or specific user input that must be received in order to authorize communications with the wireless dongle. For example, a combination of voice analysis and ear mapping may be utilized to authenticate a user. In another example, a voice command or other user input, such as "establish remote connection" may be required. User input may be used in combination with any number of user biometric readings to authenticate the user.

Next, the wireless earpieces determine whether the user is authorized (step 404). During step 404 the wireless earpieces and/or user may be authenticated. The wireless earpieces may require biometric readings, user input, or a combination of biometric readings and user input to authenticate the user. In one embodiment, the identification process may be performed automatically in response to a request to communicate with the wireless dongle or in response to communications received by the wireless earpieces from the wireless dongle. The sensor locations and types of sensors within the wireless earpieces may vary. The sensors may generate a number of biometric readings that may be utilized individually or compiled to subsequently identify the user and specific biometric factors. The sensors may include one or more inertial sensors, temperature sensors, heart pulse rate sensors, skin conductivity sensors, and microphones (i.e., analyzing the user's voice). The sensors may measure data or information that may be utilized to determine or imply the user's identity as herein described. In one embodiment, step 404 may be utilized to determine whether the user is authorized to utilize the legacy device the wireless dongle is connected to. Some legacy systems may be sensitive and the additional biometric security provided by the wireless earpieces and wireless dongle may further enhance their performance and access to authorized individuals.

The sensors may utilize any number of sampling rates or time periods for performing the sensor measurements to authenticate the user. For example, the sensors may identify the user from the moment the wireless earpieces are placed in the ears of the user such that any communication requests with the wireless dongle may be automatically authenticated. The biometric readings may also be performed in response to receiving a user request to find a tag. In another embodiment, the biometric readings may represent user input purposely provided by the user as part of the location process, such as gestures, motions, verbal commands, posing, sounds, and so forth. The specified user input or baseline readings for the biometric readings may have been previously entered, saved, or logged for utilization as part of the location process. For example, the wireless earpieces may store user preferences and access information that specify the type, order, and accuracy of biometric information and user input required to perform authentication.

The biometric readings or other user input may be analyzed for accuracy statistical significance, and so forth. For example, the biometric readings may be compared against default, baseline, or standard biometric readings for the user to ensure accuracy in identifying the user or required identifier. Likewise, user input that may be received for verification purposes may be compared against pre-established or trained data. The wireless earpieces may also perform biasing or error correction as needed to ensure the sensor measurements are accurate. For example, if a sensor from one of the wireless earpieces is experience incorrect or inaccurate data, the data from that sensor may be disregarded for purposes of performing analysis. The sensor measurements may be run through any number of computations utilizing the processor of one of the wireless earpieces. In one embodiment, a number of biometric readings and/or user input may be required to be received sequentially, simultaneously, or concurrently. The identity of the user may be determined utilizing the biometric readings and user input. In one embodiment, a number of different users may utilize the wireless earpieces at any given time. For example, each of the different users may have distinct authorized legacy systems, personal information, security settings, permissions, applications and preferences that may be located or utilized by the user. The wireless earpieces may ensure that all security measures, conditions, thresholds, and information are provided and authenticated to perform the communications with the wireless dongle.

In response to determining the user is not authorized during step 404, the wireless earpieces disconnect from the wireless dongle (step 405). The wireless earpieces prevent communications through the wireless dongle and associated legacy system in response to not authorizing the user and/or wireless earpieces. In one embodiment, the wireless earpieces may be prevented from being associated with the wireless dongle in response to determining the user is not authorized. For example, the wireless earpieces may be prevented from pairing with the wireless dongle utilizing a Bluetooth connection in step 402 in response to determining the user is not authorized. The connection between the wireless earpieces and the wireless dongle may also be terminated.

If the user is authorized during step 404, the wireless earpieces determine content to be communicated (step 404). The content may include audio, data, information, alerts, or other communications to be sent or received from the wireless dongle, the user, and associated wireless device, or so forth. For example, the content may be part of real-time communication, discrete messages, application, system information, or other data.

Next, the wireless earpieces format the content (step 408). The content may be in a raw format that requires conversion, sampling, formatting, or other processing in order to be communicated by the wireless earpieces. For communications from the wireless dongle to the wireless earpieces, the content may be similarly formatted to a proper signal type. The wireless earpieces may utilize any number of security protocols, file types, standards, or signals to ensure secure communications, such as encryption, passwords, secure identifiers, or so forth. For example, the content may be formatted into data packets to ensure proper transmission and receipt of the content.

Next, the wireless earpieces communicate the content to the wireless dongle (step 410). As previously noted, the content may be communicated directly to the wireless dongle from the wireless earpieces. In other embodiments, the content may be communicated indirectly through one or more networks, devices, systems, components, or so forth. The content may be communicated by the wireless dongle to the legacy system through the hardware interface. The content may be sent to any number of sub-systems, routines, applications, or components of the legacy system. For example, the instructions or commands from the wireless earpieces may be utilized to control navigation, entertainment, data, control, voice control, and other systems, features, functions, of the legacy system.

Next, the wireless earpieces indicate the status of the communicated content (step 412). In one embodiment, the status may indicate whether the data was successfully received. Any number of parity, error correction, data or packet confirmation, or other processes, software, or methods may be utilized to ensure communications are effectively exchanged between the wireless earpieces and the wireless dongle. Any number of alerts, warnings, or messages may also indicate the status of the wireless earpieces, wireless dongle, associated wireless device, or a connected legacy system, such as status (e.g., functional, nonfunctional, errors, etc.), battery indicators, signal strength, effective throughput, and so forth. The alerts may also indicate any trends, data, observation, or statistics that may be of interest to the user or connected devices. During any of the steps of FIG. 4 the alerts may be generated indicating the status of the association, determinations, formatting, communicating, and so forth. For example, the alerts may be communicated to the user as an audio, tactile, or visual alert, such as "the wireless dongle is connected to the wireless earpieces." The alert may also be communicated to a wireless device in communication with the wireless earpiece. For example, an alert may be sent to a cell phone in communication with the wireless earpiece to display an application specific alert to the user, such as "the maximum distance threshold between the wireless earpieces and the wireless dongle is about to be exceeded." In some embodiments, the alert may be sent through email, text message, or other designated communications technique in the event that the wireless earpieces are being utilized by an unauthorized party.

The process of FIG. 4 is similarly applicable to the wireless dongle. For example, content from the legacy system that is received and determined to be ready to be communicated is formatted by the wireless dongle and then communicated to the wireless earpieces.

The illustrative embodiments provide a system, method, and wireless earpiece(s) for communicating with a wireless dongle. The wireless dongle may include a number of interchangeable interfaces that may be utilized to match audio or data ports of legacy systems that the wireless earpieces are being utilized with. As a result, the advanced functionality, mobility, and sensors of the wireless earpieces may enhance the inputs and functionality of the legacy system when connected to the wireless dongle. The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 5:
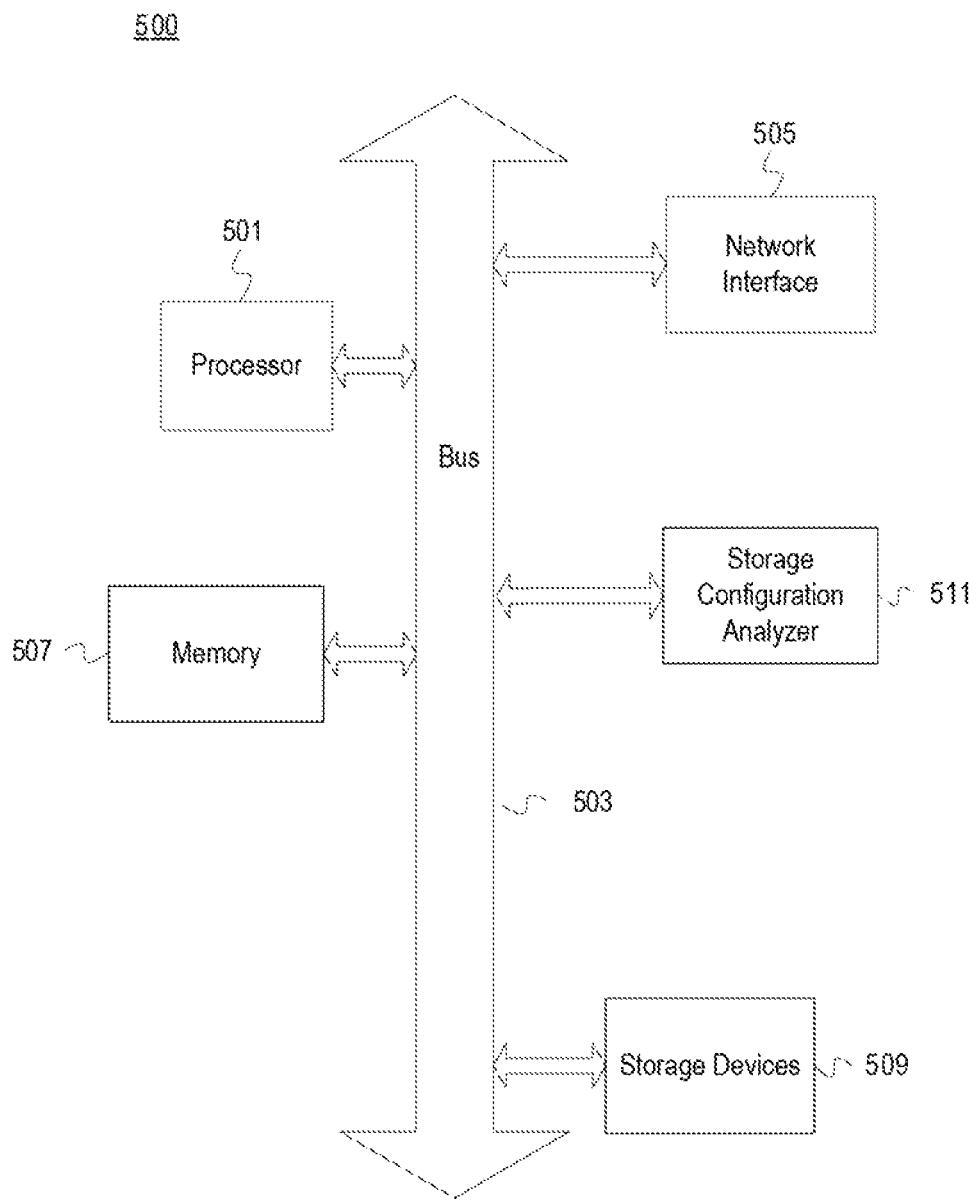
FIG. 5 depicts a computing system in accordance with an illustrative embodiment.

FIG. 5 depicts a computing system 500 in accordance with an illustrative embodiment. For example, the computing system 500 may represent a device, such as the wireless device 104 of FIG. 1. The computing device 500 may be utilized to manage communications, secure identifiers (e.g., pin, password, etc.), or communications preferences for the wireless earpieces and the wireless dongle. The computing system 500 includes a processor unit 501 (possibly including multiple processors, multiple cores, multiple nodes, and/or implementing multi-threading, etc.). The computing system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that facilitate retrieval of the audio information associated with an identifier. Code may be implemented in any of the other devices of the computing system 500. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for communication between one or more wireless earpieces and a wireless dongle, the method comprising:
    associating the one or more wireless earpieces with the wireless dongle, wherein the dongle comprises a self-contained housing having a first end and a second end, a wireless transceiver disposed within the self-contained housing, a logic engine disposed within the self-contained housing and operatively connected to the wireless transceiver, a memory disposed within the self-contained housing and operatively connected to the logic engine and a plug interface of the second end for physically connecting the wireless dongle to a port of a computing system;
    performing biometric readings of a user wearing the wireless earpieces;
    wirelessly communicating the biometric readings of the user wearing the wireless earpieces to the wireless dongle;
    determining at the wireless dongle that the user is authorized to communicate with the wireless dongle based on the biometric readings;
    communicating content between the one or more wireless earpieces and the wireless dongle in response to determining the user is authorized to communicate with the wireless dongle based on the biometric readings, wherein the wireless dongle is physically connected to the port of the computing system with the plug interface of the second end of the wireless dongle plugged into the port of the computing system;
    determining by the one or more wireless earpieces from user input at the one or more wireless earpieces that the user wearing the wireless earpieces is performing a gesture as an external command in order to control the computing system and not an internal command in order to control the one or more wireless earpieces;
    converting by the wireless earpieces the user input associated with the gesture into the external command for the computing system;
    receiving the external command at the dongle and determining if the user is authorized to perform the commands on the computing system; and
    in response to determining the user is authorized to perform the external command on the computing system, communicating the external command from the wireless earpieces through the wireless dongle and to the computing system.

2. The method of claim 1, formatting the content by the wireless earpieces prior to communicating the content between the one or more wireless earpieces and the wireless dongle.

3. The method of claim 1, wherein the content includes data and audio content.

4. The method of claim 1, further comprising:
    rejecting communicating content in response to determining the biometric readings do not authorize the one or more wireless earpieces to communicate with the wireless dongle.

5. The method of claim 1, wherein the biometric readings include at least voice characteristics and ear mapping.

6. The method of claim 1, wherein the one or more wireless earpieces are a pair of wireless earpieces worn by the user.

7. The method of claim 1, wherein the one or more wireless earpieces are associated with the wireless dongle utilizing a secure identifier.

8. The method of claim 1, wherein the biometric readings are automatically read by the one or more wireless earpieces in response to the one or more wireless earpieces being worn by the user.

9. The method of claim 1, wherein the communicating is performed automatically in response to the one or more wireless earpieces being within range of the wireless dongle.

10. The method of claim 1, wherein the system is a legacy system incapable of communicating with the one or more wireless earpieces without the wireless dongle.

11. The method of claim 1, wherein the wireless dongle includes interchangeable interfaces for selecting an interface that connects to the port of the system.

* * * * *